(No Model.)
F. J. HEGART.
VETERINARY SURGICAL INSTRUMENT.
No. 492,288. Patented Feb. 21, 1893.
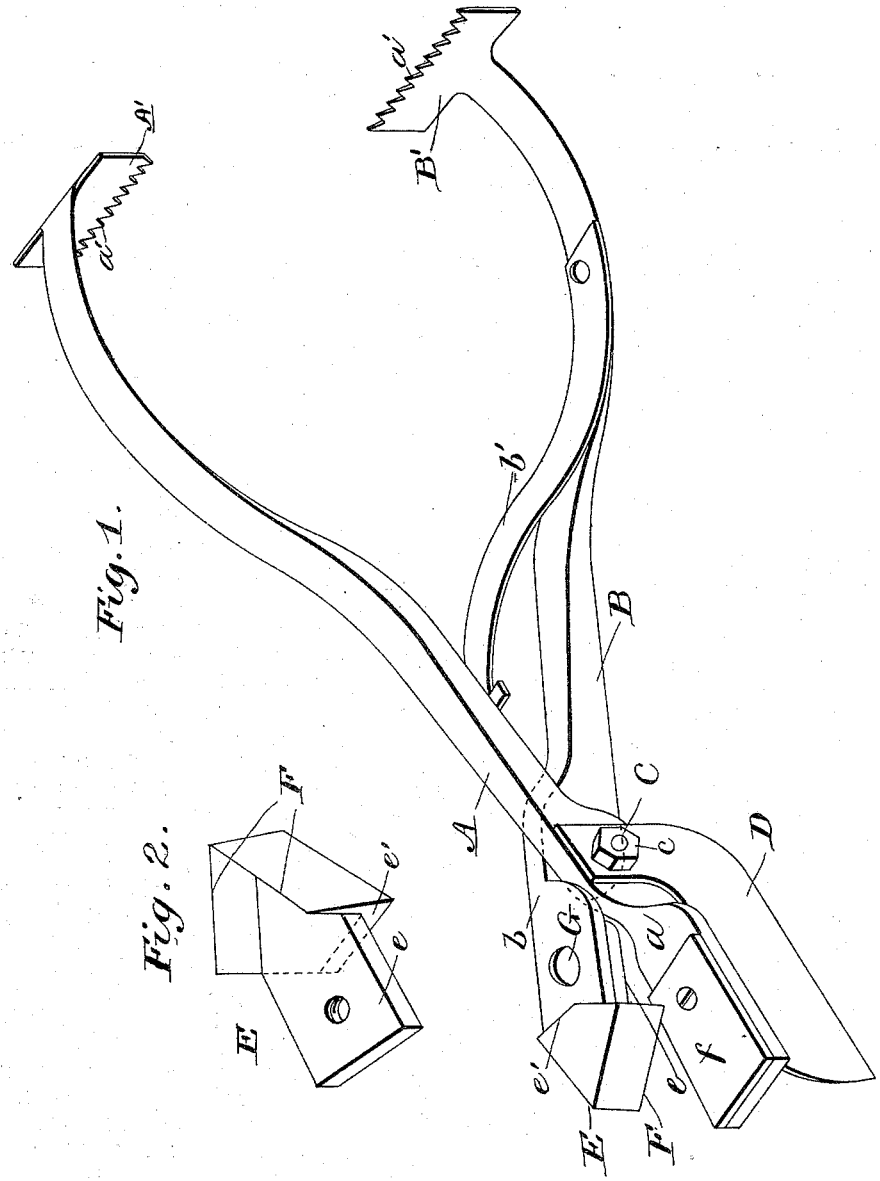
Witnesses
Albert B. Blackwood
Gales P. Moore
Inventor
Frank J. Hegart,
by Chas. S. Sturtevant
his Attorney

UNITED STATES PATENT OFFICE.

FRANK. J. HEGART, OF CHALLIS, IDAHO.

VETERINARY SURGICAL INSTRUMENT.

SPECIFICATION forming part of Letters Patent No. 492,288, dated February 21, 1893.

Application filed September 3, 1892. Serial No. 444,970. (No model.)

*To all whom it may concern:*

Be it known that I, FRANK. J. HEGART, of Challis, Idaho, have invented an Improvement in Veterinary Surgical Instruments, of which the following is a specification.

My invention is an improved combination instrument to be used in branding and castrating live stock, and it consists in the various matters hereinafter described and referred to in the appended claims.

In the accompanying drawings Figure 1 is a perspective view of my device, which, it will be seen, is of the general shape of a pair of nippers; and Fig. 2 is a view of the die for branding.

A and B are the two shanks joined by the bolt C and normally held apart by the spring $b'$, while at their upper ends they are flattened to form the plates $a, b$. Beneath the plate $a$ a knife blade D for cutting the scrotum of the animal to be castrated is secured in any suitable manner, though I prefer to bend the blade as shown and fasten it upon the bolt C by the nut $c$, this allowing certain adjustment as well as making it possible to readily detach the blade for sharpening, changing, &c. The lower ends of the shanks are also broadened and flattened to form the surfaces A', B', and these surfaces are bent inwardly so that their edges, which, as shown in the drawings, are preferably provided with teeth $a'$, will come together when sufficient pressure is exerted upon the shanks. It will be seen that the surfaces A', B', thus form nippers with which to extract the testicles when they have been exposed by cutting the scrotum, and to aid in this extraction by affording ample space for the testicles, the shanks are curved outwardly as shown.

I shall now describe the part of my device designed for branding the animal by cutting the ear.

The die E is shown in Fig. 2 and its cutting edges may be arranged in any desired shape. It consists of a plate $e$ provided with a shoulder $e'$ and to this plate are attached the cutting edges F. The plate $e$ of this die extends beneath the flattened surface $b$ of the shank B, and is clamped thereto by the screw G passing through the surface $b$ and engaging with threads in the plate $e$. This die is further secured in position by reason of a suitable joint being formed by the die and the surface. This joint is here shown as simply a notch though of course any well known form may be employed without departing from the spirit of my invention. The surface $a$ is provided upon its upper side with a plate $f$ of soft metal with which the cutting edges F come in contact in completing the operation of branding.

Having thus described my invention, what I claim as new, and desire to secure by Letters Patent, is—

1. A combined tool in the general shape of a pair of nippers, comprising a branding device attached to the upper ends of the shanks, and gripping surfaces attached to the lower ends thereof, substantially as described.

2. A combined tool in the general shape of a pair of nippers, the upper end of one shank being provided with a cutting die, the upper end of the other shank forming a surface against which the die bears in completing the operation of branding, and gripping surfaces attached to the lower ends of said shanks; substantially as described.

3. A combined tool in the general shape of a pair of nippers, the upper ends of the shanks of which form a branding instrument, a knife connected to and moving with one of said upper ends, and gripping surfaces attached to the lower ends of the shanks; substantially as described.

4. A combined tool in the general shape of a pair of nippers, the upper ends of the shanks of which form a branding instrument, a knife upon one of said upper ends, said knife being secured to the bolt through the shanks, and gripping surfaces attached to the lower ends of said shanks; substantially as described.

5. A combined tool in the general shape of a pair of nippers, the lower ends of the shanks of which are provided with gripping surfaces, the upper end of one of said shanks having a flattened surface, and a die comprising a plate provided with cutting edges, said plate being secured upon said flattened surface; substantially as described.

6. A combined tool in the general shape of a pair of nippers, the lower ends of the shanks of which are provided with gripping surfaces, the upper end of one of said shanks forming a flattened surface, and a die comprising a plate provided with cutting edges and a shoulder, said plate being fastened upon said flattened surface, and said shoulder bearing against the end of the flattened surface; substantially as described.

7. A combined tool in the general shape of a pair of nippers, the lower ends of the shanks of which are provided with gripping surfaces, the upper end of one of said shanks forming a flattened surface provided with a depression, and a die comprising a plate provided with cutting edges and a shoulder, said shoulder having a projection formed thereon, the plate being fastened upon the flattened surface, and the projection upon the shoulder engaging with the depression in said flattened surface; substantially as described.

In witness whereof I have hereunto signed my name in the presence of two subscribing witnesses.

FRANK. J. HEGART.

Witnesses:
 ONUN LONG,
 ROBERT WENDT.